Patented June 6, 1944

2,350,522

UNITED STATES PATENT OFFICE 2,350,522

MANUFACTURE OF AZO PIGMENT DYE-STUFFS AND COATING COMPOSITIONS

Grady M. O'Neal, Chicago, Ill., assignor to The Sherwin-Williams Company, Cleveland, Ohio, a corporation of Ohio No Drawing. Application March 17, 1943, Serial No. 479,495

27 Claims. (Cl. 106—219)

The present invention relates generally to organic pigments and coating compositions, and, in particular, to various azo pigment dyestuffs. It also relates to coating compositions made therefrom, such as printing inks, paints, enamels, etc.

It has long been recognized in the industry that organic pigment dyestuffs possess useful brilliance, strength, and light-fastness. However, azo pigment dyestuffs have a number of objectionable features which greatly limit their use in pigment coating compositions, such as printing inks, paints, enamels, and the like, these objectionable features being a serious matter in the graphic arts. The pigments are in general difficult to grind or disperse in a given vehicle, and the coating compositions made therefrom possess these general qualities: they offer poor resistance to lithographic breakdown, as in the case of inks; they tend to set-up; and they possess only mediocre working properties. These defects make such pigments objectionable to the manufacturer of pigment coating compositions because of the difficulties connected with their processing; and to the coating composition user, because of the limitations that govern their application.

The above defects of azo pigment dyestuffs apply also to the same pigments modified by striking them or otherwise forming them to include a rosin soap or other organic soap substratum. Such modified pigments, generally known as lakes, have been made principally for the purpose of distending the full strength pigments and modifying their tone or shade, particularly to avoid a characteristic bronziness or metallic luster when used in coating compositions, such as inks. In such lake pigments the substrata are, in certain instances, parts of the pigments themselves because, where the salt form azo dyestuff and soluble soap are converted simultaneously, there is some sharing of the common precipitant cation by the dyestuff form and the soap. A high proportion of added material has been employed to secure these old objectives for the prior art substratum.

The term "azo pigment dyestuff" includes pigments of both the salt and non-salt forms. Such pigments may be extended, as by substrata or diluents, with organic and inorganic materials to obtain various effects. Organic materials commonly employed are various soaps, such as the rosinates, para, and fatty acid types. Inorganic materials are, for example, blanc fixe, aluminum hydrate, aluminum phosphate, magnesium carbonate, and others. Such organic or inorganic substrata are generally present in sizable amounts upwards by weight of 10 parts to as high as 100 parts of soap-forming acids to 100 parts of pigment, and occasionally in even greater amounts. Azo pigment dyestuffs containing the various extenders in such relatively large amounts are known as lakes, but for the purposes of the present invention lake-forms are considered as those having at least 10 parts of the soap-forming acid to 100 parts of the pigment, and non-lake forms are those having less or no extender. This definition is made because the art is not definite on this point.

The tinctorial strength of pigments to which a substratum has been added is necessarily reduced to an increasing extent as the amount of extender is increased, and, in the case of an organic substratum, the tone or shade is often modified, depending upon the nature of the particular extender.

The principal object of the present invention is to produce a pigment having a minimum of loss in the color strength and tone characteristics of the full strength pigment, but having working properties and features heretofore unobtainable in either an azo pigment dyestuff or an azo pigment dyestuff lake. I am able to accomplish these results while using relatively small amounts of certain water-insoluble metallic soaps, preferably less than 10% as soap-forming acids, as distinguished from the large quantities formerly employed in forming substrata in lake type pigments. Thus the present invention aims to improve azo pigment dyestuffs in their full-strength form, that is, without the prior art large quantities of soap substrata, so that they are more acceptable to the manufacturer and the user of pigment coating compositions, offering possibilities for wider uses and improved qualities in presently acceptable uses.

Particular objects of the invention are to impart properties to azo pigment dyestuffs so that coating compositions made therefrom will possess one or more, or all, of the following qualities: improved or easier dispersion of the pigment into the vehicle selected for the specific composition; lessened set-up tendencies; greater film gloss; greater flow; and improved lithographic breakdown resistance, when used as inks.

In effecting the objects of the invention, the fundamental chemistry involved in forming the pigments is not changed, but variations in the final steps of the recovery procedure are so made that the ultimate physical qualities are improved. In particular, the pigment is made so that its surface will present controlled properties whereby the interfacial relation of solid (pigment) to liquid (vehicle) is changed to a more favorable one. The pigment is believed to be altered not only at the surface of the originally formed particle, but throughout its dry particle form, so that on grinding into a vehicle the desired favorable relation is presented by new surfaces created in grinding the original particle. Thus, the pigment mass presents improved grinding and wetting qualities toward numerous vehicles commonly employed in the industry. The materials employed to accomplish the above results remain with the pigment for another function. They serve as inhibitors of emulsion formation, so that in operations where emulsions may form, as where inks are used in the wet lithographic printing process, the tendency to emulsify is greatly lessened. Going still a step further, by the presence of salt electrolyte, the solid-liquid interfacial characteristics are further changed, resulting in improved wetting properties, which in turn effect better dispersion and greater emulsion inhibition.

In carrying out my invention, the originally-wet form of a non-salt form azo pigment dyestuff or of a salt-form azo pigment dyestuff, is well dispersed in an aqueous slurry to secure a fine state of subdivision. This is accomplished before any drying of the product, which drying causes small particles to agglomerate into large particles or more compact particles. Hence, the process may be carried out as an extension of the procedure by which the azo pigment dyestuff or its salt form is initially formed. Such slurry of said particles is treated so as to subject the particles to an application of certain water-insoluble metallic soap material as a soap or soaps. The soap material may be applied by forming or otherwise precipitating it in the presence of the pigment particles. This may be done, for example, by having present in the pigment slurry suitable water-soluble soap-forming ingredients, and adding a suitable agent, or agents, reactive therewith to form the insoluble soap or soaps. Preferably, water-soluble soaps of the desired soap-forming acids are present, and a solution of one or more soluble salts of the desired metal or metals for the insoluble soap or soaps is added to effect a formation of the water-insoluble metallic soap material.

All soap-forming acids are not effective for the purposes of this invention, and no single, simple type of soap-forming acid is suitable. The effect depends upon the presence of soap derived from at least two different types of soap-forming acids, as described hereinafter. When the full color strength of the non-lake pigments is desired, it is preferable to employ the soap in quantity such that there are not more than 10 parts of soap-forming acids for every 100 parts of pigment. However, to employ a higher ratio of soap to pigment is contemplated as being within the scope of my invention whether or not the resulting product exhibits the characteristics of the non-lake type of pigments. One of the two types of acid which I have found to be particularly effective is rosinic acid.

The scope of the term "soap" is not clearly defined in the technical literature, and the term is loosely and often improperly employed. Since the present invention makes use of soaps, I have chosen to define them by defining the acids from which they are derived. For the purposes of this invention, the soap or soaps employed must be derived from certain classes of soap-forming acids, which are hereinafter defined as "rosinic acid" and "fatty type acid."

"Rosinic acid," as the term is used in describing the present invention, contemplates rosin and abietic acid; modifications of rosin, such as heat-modified rosin and solvent-extracted rosin; chemical derivatives of rosin, such as hydrogenated rosin or abietic acid; the complex soap-forming acids resulting from the condensation product of rosin or abietic acid with unsaturated aliphatic acids having up to, but not more than, two carboxyl groups, as described hereinafter; and other chemical derivatives of rosin or abietic acid. Soaps of the complex soap-forming acids resulting from such rosin or abietic acid condensation derivatives are the subject of my cofiled application, Serial No. 479,499.

The term "fatty type acid," for the purposes of the present invention, contemplates: (1) the various $\alpha,\beta$- unsaturated aliphatic acids having up to, but not more than, two carboxyl groups, such as maleic acid, crotonic acid, acetylene dicarboxylic acid, citraconic acid, and the like, which are capable of being condensed with rosin or abietic acid by the Diels-Alder reaction (described hereinafter, and also in more detail in my cofiled application Serial No. 479,499); (2) the saturated and unsaturated soap-forming aliphatic acids, which have at least 8 carbon atoms including a carboxyl group carbon in an open carbon chain, such as caprylic acid, ricinoleic acid, oleic acid, linolic acid, linolenic acid, palmitic acid, and the like; and (3) the soap-forming naphthenic acids, defined hereinafter, and others of a cycloaliphatic nature, each carboxyl group of which is attached to the cyclic carbon chain through at least one intermediate carbon atom so that each carboxyl group is part of an aliphatic side chain of at least two carbon atoms. By this last mentioned limitation, I intend to include in this third class of fatty type acids those cycloaliphatic compounds, such as naphthenic acids, in which the carboxyl group is part of an aliphatic radical having at least two carbon atoms (including the carboxyl group carbon) and is not attached directly to a carbon atom of a cyclic carbon chain, and to exclude and differentiate from such compounds as the "rosinic acids," defined above, in which the carbon atom of the carboxyl group of the rosin or abietic acid is attached directly to a carbon atom of a cyclic carbon chain.

It is well known that many of the fatty type acids in group (2) in the preceding paragraph, both saturated and unsaturated, are found as mixtures in vegetable oils and animal fats, principally in the form of glycerides. Among the vegetable oil acids which are useful in the present invention, for example, are those from the oils of perilla seed, soya bean, sunflower seed, corn, rapeseed, and linseed. A typical analysis of perilla oil acids, to illustrate one class, is as follows:

| Nature of acid: | Percentage |
| --- | --- |
| Oleic | 4.0–10.5 |
| Linolic | 33.0–44.0 |
| Linolenic | 44.0–49.0 |
| Palmitic (substantially) | 6.5– 8.0 |

Napthenic acids are secured from petroleum during refining and are defined by "Richter's Organic Chemistry," vol. II (1939), p. 64, essentially as follows: They consist of saturated monocyclic acids of the general formula $C_nH_{2n-2}O_2$, which have been found to be alkylated carboxylic acids of the cyclopentane series up to $C_{12}H_{22}O_2$; of two paraffin-carboxylic acids $C_6H_{12}O_2$ and $C_7H_{14}O_2$; and some bicyclic compounds of the general formula $C_nH_{2n-4}O_2$ ranging from $C_{13}H_{22}O_2$ to $C_{22}H_{40}O_2$.

The term "fatty type acid" includes in group (1) of the above definition certain short chain acids, such as maleic acid, which are not "soap-forming acids," as the latter term is generally understood. I wish to make it clear, therefore, that such acids, since they are not alone truly "soap-forming" when reacted to form a metal salt, are not contemplated by the expression "soap of a fatty type acid." However, they are "soap-forming" acids when chemically combined with rosin, and, therefore, are intended to be included as members of the group of "fatty type acids" useful for the purposes of the present invention. When chemically combined with rosin and suitably reacted with a metal, they enter into the formation of a soap which is both rosinic and fatty type in nature and which is embraced by the broad terms "soap derived in part from 'rosinic acid' and in part from 'fatty type acid'" and "soap of both a 'rosinic acid' and a 'fatty type acid.'"

The expression "soap derived in part from 'rosinic acid' and in part from 'fatty type acid,'" and equivalent expressions, as used in connection with the present invention, contemplates the inclusion of (a) a physical mixture of one or more rosinic acids with one or more soap-forming fatty type acids; (b) chemically combined rosinic acid and fatty type acid, such as the rosin-maleic acid condensation product later described which is a single compound which is both rosinic acid and fatty type acid as defined in this specification; (c) mixtures of ((b) with a soap-forming fatty type acid; (d) mixtures of (b) with a resinic acid; and (e) mixtures of (b) with (a).

Various metals may be used to provide soap, so long as the soap formed is water-insoluble, but the preferred ones are the alkali-earth metals such as calcium, strontium, barium, and magnesium, which metals are commonly present in the salt-form pigments.

It has been determined that, for the purposes of this invention, the combination of soaps of rosinic and fatty type acids gives especially efficacious results for the quantity employed when the amount of rosinic acid is about twice the amount of fatty type acid, although the advantages of using the mixture of soaps are not limited to such proportions.

By the aforesaid subjection of the water-suspended particles of pigment, unagglomerated by drying, to the precipitation of the water-insoluble soaps in the same slurry, either from solution or by formation, the particles act as nuclei for the precipitated soaps. The pigment particles, being unagglomerated or not compacted, are capable of receiving an application of metallic soap, not only on the surface, but in any crevices, pores, or openings of the individual particles. Thus, the particles so treated may be permitted thereafter to agglomerate, or unite, or be individually compacted, as occurs when they are filtered and dried. On regrinding, the soaps form lines of cleavage for the particles, making grinding into a vehicle easier, providing new particles for dispersion having surfaces favorable to easy dispersion, and forming better dispersions in coating compositions.

After the soaps have been precipitated onto the pigment, water-soluble salt electrolyte may be retained during the subsequent step of recovering the soap-modified pigment from the suspending liquid. Its retention effects further improvement in the pigment for the purpose of forming pigment coating compositions. The nature and quantity of the salt electrolyte may vary widely.

The term "salt electrolyte" comprehends generally those salts which are water-soluble and substantially neutral when ionized in aqueous solution, in particular the water-soluble salts of the alkali and the alkali-earth metals. While salts of the strong mineral acids, such as hydrochloric and nitric, are most usually illustrated in the following examples, others have been employed, such as salts of sulfuric acid or salts of weak organic acids (formic, acetic, citric, oxalic and others). Also, cations other than the alkali and alkali-earth metals have been used as salts of a variety of acids, such cations being of iron, lead, zinc, manganese, copper and others. In general the choice of the most effective salt electrolyte for any particular application is best determined experimentally.

All of the salt electrolyte present in the aqueous slurry of the soap-treated pigment is not of necessity retained by the final pigment. A considerable portion is drained off in the aqueous medium upon filtering the pigment from it. That which is retained by the pigment on filtering or other separation of solid and liquid may be retained with the pigment by not washing it, or be diminished in quantity as washing may be practiced. While the original pigment or pigment salt may be freed from water-soluble material, necessarily present after its initial formation, by filtering, washing, and then, without drying, resuspending in water for the soap application, it is preferred that some of the medium in which the pigment was originally formed be retained. The reaction by which the insoluble soaps are precipitated may also result in the formation of soluble salts which, with any residual salt formed in creating the pigment, may provide all or part of the salt electrolyte. It is to be understood, of course, that the salt electrolyte may be provided by an excess of water-soluble salt used to form the soaps, or by adding salt electrolyte at any stage in the process through recovery of the soap-modified pigment.

The invention may best be illustrated by reference to the following specific examples of its application to actual practice, although it is to be understood that the examples are given merely as illustrations and are not to be construed as limiting the scope of the invention. In these examples, all parts are given by weight.

EXAMPLE 1

LAKE RED C PIGMENT—*The barium salt of the coupling of 2-chloro-5-toluidine-4-sulfonic acid with 2-naphthol. See Schultz, "Farbstofftabellen" (1931), No. 195.*—To 300 parts of a slurry of the pigment (dry content 20 parts) in water, with the pigment still wet from the forming process, add a 10% aqueous solution of the sodium salts of crude naphthenic acids in quantity equivalent to introduce 0.2 part of crude naphthenic acids. Then add 0.19 part of barium chloride ($BaCl_2.2H_2O$) dissolved in 10 parts of water. Then add 0.4 part of WW wood rosin, as the sodium salt dissolved in a 10% aqueous solution. Then add 0.32 part by weight of barium chloride ($BaCl_2.2H_2O$) in 10 parts of water.

During the process the temperature is preferably kept at 50° to 55° C. While the temperature is not critical, it does affect the rate of the precipitation reactions. It is desirable to maintain, for standardized products, a rather close control of temperature, because a deviation from a prescribed temperature, in some cases, affects the value of the color. The preferred temperature in this example has been found to give the particular results which applicant desires and need be followed closely only for the purpose of obtaining reproducible results. After each addition, an agitation period of 5 minutes is generally satisfactory for thorough mixing, except that, at the end, 15 minutes of mixing is desirable to insure completion of the reactions and other phenomena. Then filter, and dry without washing.

In the above example, the soaps formed as barium rosinate and barium naphthenates. Any salt electrolyte in the medium is partially lost in the filtrate upon filtering, and the remainder accompanies the pigment. The total soap-forming-acid content of the soap is but 3% of the dry weight of the original pigment, being 2% of rosinic acid and 1% of fatty type acid.

By conventional methods the pigment is ground into a lithographic varnish to make a composition as follows:

| | Parts by weight |
|---|---|
| Pigment | 20 |
| No. 0 regular litho varnish (a bodied linseed oil) | 24 |

By making inks of the same pigment with and without the above described treatment, the improvements become apparent. Thus, when an ink prepared from the treated product of Example 1 is compared with an ink prepared from the same pigment produced by the conventional methods, it is found to possess these improved properties:

*Grinding.*—The treated pigment gives an ink of the same degree of particle dispersion as the ordinary product in approximately ⅓ less grinding time.

*Working properties.*—There is a much improved ink body in terms of softness and length.

*Lithographic breakdown resistance.*—The ink resulting from the treated product displays much improved resistance to lithographic breakdown.

*Set-up tendencies.*—These are considerably lessened.

*Brilliance and gloss of ink film.*—These are considerably improved.

EXAMPLE 2

GRAPHIC RED PIGMENT—*The calcium salt of the coupling of 2-naphthylamine-1-sulfonic acid with 2-naphthol. See Schultz, "Farbstofftabellen" (1931), No. 219.*—Following the general procedure of Example 1, to 485 parts of water containing well-slurried pigment pulp in the amount of 17.5 parts (dry content), add, if desired, 0.39 part of the condensation product of naphthalene sulfonic acid and formaldehyde, dissolved in 10 parts of water, to assist in the dispersion of the pigment in the water. Then add 0.39 part of Perilla oil fatty acids, as the sodium salts in a 10% aqueous solution. To this add 0.37 part of barium chloride ($BaCl_2.2H_2O$) dissolved in 10 parts of water. Then add 0.78 part of a condensation product of approximately 1 part of maleic anhydride and 6.8 parts of E wood rosin, as the sodium salt in a 10% solution. Then add 0.62 part of barium chloride ($BaCl_2.2H_2O$) in 10 parts of water. This point in the procedure is designated as "Stage A" for reasons appearing below.

Up to this point, it is seen that one insoluble soap is built upon another, just as in Example 1. However, rather than filtering at this point as in Example 1, an excess of 2.0 parts of barium chloride ($BaCl_2.2H_2O$) in 20 parts of water is added, followed by 10 minutes agitation. Then filter, and dry without washing. The dried pigment is designated "product B."

In product B, the salt electrolyte will include a part of the salt last added and also some sodium chloride resulting from the sodium of the water-soluble soaps, plus any salt electrolyte which may have come into the original pigment slurry as a result of incomplete washing of the pigment after its formation. The total acid content of the soaps is 6.7% of the original pigment, being 2 parts of rosinic acid to 1 part of fatty type acid. The salt electrolyte retained is variable with the character of the procedure, especially the filtration.

The following comparison shows particularly the value of salt electrolyte in the pigment:

At stage A, above referred to, the pigment is filtered, thoroughly washed, and dried, giving "product A," containing no salt electrolyte. Then the product B, resulting from Example 2 as completed and identified above, which contains salt electrolyte, is compared with product A by preparing two inks from products A and B, respectively, having 20 parts of pigment to 24 parts of No. 0 regular litho varnish. These inks are designated "ink A" and "ink B" according to the pigments used therein.

Ink B, containing some of said added excess salt electrolyte, shows a radical improvement over ink A, prepared from the pigment containing no salt electrolyte, in terms of body-softness and flow. The lithographic breakdown resistance of ink B constitutes a very marked improvement over that of ink A.

By conventional methods the treated pigment may be ground into other vehicles, such as a very long linseed oil-alkyd resin varnish vehicle commonly employed in making inks, to make a composition as follows:

| | Parts by weight |
|---|---|
| Pigment | 20 |
| Vehicle | 48 |

The above vehicle is a linseed oil-alkyd-resin varnish of the following commercial specifications:

a. 100% non-volatile.
b. Y to Z body on Gardner-Holdt scale.
c. Acid value not over 6.
d. Capable of infinite dilution with mineral spirits.
e. Flash point over 500° F.
f. Useful at 48 parts by weight with 20 parts of pigment.

By conventional methods the treated pigment may be ground into a medium length linseed oil-alkyd resin varnish vehicle, such as is employed in enamel use, to make a composition as follows:

| | Parts by weight |
|---|---|
| Pigment | 20 |
| Vehicle | 48 |

The above vehicle is a linseed oil-alkyd resin varnish of the following commercial specifications:

a. 50% non-volatile.
b. X to Z body on Gardner-Holdt scale.
c. Acid value of 3 to 5.

d. Specific gravity of 0.915.
e. All solvents are petroleum solvents.

When a pigment coating composition is prepared according to either of the above formulations with my new treated pigment of either Example 1 or Example 2, and such coating composition is compared with a similar composition prepared from the same pigment produced by conventional methods, the coating compositions resulting from the pigments of Examples 1 and 2 show marked improvements over the coating compositions made with the untreated pigments.

EXAMPLE 3.

SOLFAST RED PIGMENT—*The strontium salt of the coupling of 4-chloro-aniline-3-sulfonic acid with 2-hydroxy-3-napthoic acid.*—Following the procedure of Example 1, use the following materials:

1. 300 parts of water containing well slurried pigment pulp in the amount of 20 parts (dry content).
2. Solution of 0.2 part of the condensation product of naphthalene sulfonic acid and formaldehyde in 10 parts of water. (Optional).
3. Solution of 0.2 part of crude naphthenic acids, as the sodium salts in a 10% solution in water.
4. Solution of 0.19 part of barium chloride ($BaCl_2.2H_2O$) in 10 parts of water.
5. Solution of 0.4 part of WW wood rosin, as the sodium salt in a 10% solution in water.
6. Solution of 0.32 part of barium chloride ($BaCl_2.2H_2O$) in 10 parts of water.

The acids of the soap amount to 3% of the original pigment, being 2 parts of rosinic acid to 1 part of fatty type acid.

In the foregoing Examples 1 and 2, azo pigment dyestuffs of different constitution have been illustrated, but only azo pigment dyestuffs with a single salt-forming group were mentioned therein. In Example 3 an azo pigment dyestuff also in salt-form, and of a still different structure, is illustrated with the additional difference that two salt-forming groups are present.

By making use of the above procedure, an azo pigment dyestuff is obtained which, when ground into No. 0 Regular Litho Varnish, displays greater ease of dispersion into the vehicle, better ink body and flow, and greater brilliance and ink film gloss than the untreated pigment form. In addition, the tendency of this pigment to give hard and agglomerated particles upon drying is eliminated, thereby, in certain instances, resulting in a marked increase in tinctorial strength.

EXAMPLE 4.

GRAPHIC RED PIGMENT—*The barium salt of the coupling of 2-naphthylamine-1-sulfonic acid with 2-naphthol. See Schultz, "Farbstofftabellen" (1931), No. 219.*—Following the procedure of Example 2, use the following materials:

1. 485 parts of water containing well-slurried pigment pulp in the amount of 19.7 parts (dry content).
2. Solution of 0.39 part of the condensation product of naphthalene sulfonic acid with formaldehyde in 10 parts of water. (Optional.)
3. Solution of 0.39 part of Perilla oil fatty acids, as the sodium salts in a 10% solution in water.
4. Solution of 0.37 part of barium chloride ($BaCl_2.2H_2O$) in 10 parts of water.
5. Solution of 0.78 part of a maleic acid-rosin condensation product (see Example 2), as the sodium salt in a 10% solution in water.
6. Solution of 0.62 part of barium chloride ($BaCl_2.2H_2O$) in 10 parts of water.
7. Solution of 2.0 parts of sodium nitrate in 20 parts of water.

In this example the soap-forming acid components of the soaps amount to approximately 6% of the original pigment, being 2 parts of rosinic acid to 1 part of fatty type acid. Also illustrated is the use of a different salt electrolyte (sodium nitrate) upon completing the mixed soap precipitation.

The above pigment may be ground by conventional methods into common vehicles for various types of coating compositions. To illustrate, the following composition is a printing ink:

| | Parts by weight |
|---|---|
| Pigment | 45 |
| Vehicle: | |
| No. 0 regular litho varnish | 1 ⎫ |
| Paraffin oil having no naphthenic base and 102 seconds viscosity at 100° F | 3 ⎬ 55 |

The same pigment may also be used to prepare ink compositions, using vehicles of the type illustrated in Example 1, and following Examples 1 and 2. In each case, the advantages described under Example 1 are obtained over a similar ink made with the same type of pigment produced by conventional methods.

EXAMPLE 5.

PERMANSA RED PIGMENT—*The coupling of 2-chloro-4-nitraniline with 2-naphthol.*—To 347 parts of water containing well-slurried pigment pulp in the amount of 15 parts (dry content), add 0.29 part of Perilla oil fatty acids, as the sodium salts in a 10% solution in water, and 0.54 part of the maleic acid-rosin condensation product (see Example 2), as the sodium salt in a 10% solution in water. Stir, heat to boiling, and boil for 5 minutes. Then add 0.38 part of anhydrous zinc chloride dissolved in 10 parts of water. Stir for 5 minutes. Then add 5 parts of calcium chloride ($CaCl_2.2H_2O$) dissolved in 20 parts of water. Stir for 5 minutes, filter, and dry without washing.

This example illustrates the application of my invention to a non-salt form of azo pigment dyestuff, rather than the salt forms of the preceding examples. Also, it illustrates the variability in the method of applying the mixed soaps, as well as another use of salt electrolyte.

The soap-forming acid components of the soaps amount to 5.5% of the original pigment, being 3.6% of rosinic acid and 1.9% of fatty type acid.

EXAMPLE 6.

TOLUIDINE RED PIGMENT—*The coupling m-nitro-p-toluidine with 2-naphthol. See Schultz, "Farbstofftabellen" (1931), No. 86.*—The identical procedure in Example 5 is followed, using quantities as given therein.

This is also an example of a non-salt form of azo pigment dyestuff, and illustrates the applicability of the invention to an azo pigment dyestuff of a still different chemical constitution.

Improvements are obtained in Examples 5 and 6 which are of the same nature and of the same general order as in the preceding examples.

The foregoing examples may be varied with the same advantageous results by the substitution of any one of the various rosinic acids or rosinic and fatty type acid condensation products for the particular rosinic acid illustrated, and by the substitution of any one of the soap-forming fatty type acids for the particular fatty type acid illustrated.

Where, as in Examples 5 and 6, water-insoluble soaps are precipitated with a common cation, that is, one which is more than monovalent, from a solution of two distinct soluble soaps of different soap-forming acids, it is to be appreciated that three types of water-insoluble metallic soap may result. There may be one in which there is only one of the two acids. There may be another in which there is only the other of the two acids. And there may be a third which contains both of the two acids. In the accompanying claims, where "water-insoluble soaps of a rosinic acid and of a fatty type acid" are referred to, it is contemplated that such soaps may consist of all three of the possible types mentioned.

The above examples all prefer the final product containing salt electrolyte. This is preferably effected by not washing the salt from the product. However, the products may be washed free from salt electrolyte without falling outside the scope of the present invention. Products so washed, either before or after drying, may again be treated with a solution of salt electrolyte to reestablish the advantage resulting from its presence in the final product herein described. The invention of this application is dependent primarily upon that part of the process involving the combination of two types of metallic soaps, but the resulting product is further improved by the presence of the salt electrolyte. It has been established that, when one or both of the soap-forming acids is or are omitted and the salt electrolyte is present, the additional effect from the salt electrolyte is not evident to nearly so marked a degree. The advantage of the salt electrolyte is largely dependent upon the presence of at least one soap, as is more particularly described and claimed in my cofiled application, Serial No. 479,497. The optimum advantage is achieved when using in combination water-insoluble metallic soaps of a rosinic acid and of a fatty type acid.

The choice of the particular water-insoluble, rosinic and fatty type acid metallic soap combination may vary. To illustrate, the combination of the soaps of rosin and one of the many possible fatty type acids; the combination of the soaps of hydrogenated rosin and one of such fatty type acids; and the combination of the soap of a complex soap-forming acid resulting from the condensation product of rosin and an unsaturated aliphatic acid having up to, but not more than, two carboxyl groups and a soap of one of the fatty type acids, all afford products of somewhat different properties and value, depending upon the proportion of rosinic acid to fatty type acid, the particular fatty type acid and rosinic acid employed, and the nature of the specific metal soap form of the selected rosinic and fatty type acid combination. It is to be understood, however, that properties and advantages are secured using the rosinic-fatty type acid soap combination that cannot be obtained by the use of only rosin, or abietic acid, no matter what its metal soap form may be.

The term "rosinic acid" has been defined heretofore; however, in order to further clarify one aspect of this definition, it may be pointed out that "the complex soap-forming acids" result from the condensation product of rosin or abietic acid with unsaturated aliphatic acids having up to, but not more than, two carboxyl groups. In my cofiled application, Serial No. 479,499, previously referred to, the basic concept is the production of water-insoluble metallic soaps from complex soap-forming acids obtained by chemically combining rosin or abietic acid with unsaturated aliphatic acids having up to, but not more than, two carboxyl groups. It has been shown in that application that the actual procedural route for arriving at these desired complex acids is capable of wide variation. In one example, a typical ethylene dicarboxylic acid, in the form of its anhydride, is condensed with rosin to give the complex soap-forming acid directly. In a second example, a typical mixture of unsaturated, long-chain, aliphatic, monocarboxylic acids that are common in drying oils is condensed (the glyceride esters of these unsaturated monocarboxylic acids being employed in this instance) with rosin to give a condensation-polymer glyceride ester, this ester being then saponified with alkali to give the desired complex soap-forming acids. It is possible to use other ester forms of these unsaturated aliphatic acids in effecting their condensation with rosin or abietic acid, and it is not necessary that these esters be those of unsaturated, long-chain, aliphatic, monocarboxylic acids. For example, it is possible to form the identical maleic acid-abietic acid condensation product obtained by reacting maleic anhydride with abietic acid by condensing instead, the dimethyl ester of maleic acid with abietic acid to give the ester adduct, and then subsequently saponifying the ester adduct with alkali. All of this is well known. In the case of linseed oil, which was employed in the second example just referred to and which is illustrative of one drying oil, two unsaturated aliphatic acids are mainly present: linolic or 9:12 - octadecadienoic acid; and linolenic or 9:12:15-octadecatrieonic acid. Linolic acid is an unsaturated monocarboxylic acid of the general type, $C_nH_{2n-3}COOH$; and the linolenic acid, an unsaturated monocarboxylic acid of the general type, $C_nH_{2n-5}COOH$. Hence, it is seen that a large number of complex soap-forming acids, capable of forming water insoluble metallic soaps for the purpose of this invention, are available.

While some of the foregoing examples do not include the step of incorporating the soap-modified pigment into a vehicle to form a coating composition, it is to be understood that the pigments of each of the examples are adapted for use in the various, well-known, non-aqueous, liquid vehicles to produce printing inks, paints, enamels, and the like, whether the vehicle is one which dries by oxidation, evaporation, penetration, or gelation, or by a combination of any or all of these drying processes. The invention not only concerns the process of incorporating the pigments into non-aqueous liquid vehicles, but also the new and improved coating compositions which result.

Where the pigments are sold in commerce as such, they are commonly dried as described in the examples above. However, where they are made into coating compositions with vehicles at the point of manufacture of the pigment, it is not necessary to dry them as described. The wet cake from filtering the pigment, either washed or not, may be flushed into the vehicles by well known procedures. The soaps of the present invention act also as flushing agents to aid in such manipulation. The water of the cake breaks out into a separable layer in the usual manner, leaving the vehicle with the pigment and soap or soaps incorporated therein, and salt electrolyte, also, where sufficient of this was present initially, or has been added, as for example to the mass to be flushed. The pigments described above in Examples 1, 2, and 4 have been successfully used in this way with a No. 0 regular litho varnish.

It is to be noted that, whereas prior art azo pigment dyestuffs having a single soap as a substratum have been made by the addition of considerable quantity of a soluble or an insoluble soap prior to or during the chemical formation of the pigment dyestuff, the present invention makes much more effective use of a small soap content to attain entirely new objectives, and involves both the use of a certain combination of soaps and the depositing of the soaps in the presence of the pigment after it has been formed chemically, but before it is completed physically.

In conclusion, it is to be understood that, to those skilled in the art, this invention is capable of wide variation. The nature of the specific fatty-type acid, rosinic acid, and salt electrolyte, and the many possible and feasible combinations of these variables as to material and procedure, make possible the extension of this invention far beyond the few specific examples that have been given in this specification. The claims which follow are intended to cover such extensions and variations of the examples as will naturally occur to one skilled in the art.

In the foregoing specification I have disclosed an invention for producing novel salt and non-salt form azo pigment dyestuffs and compositions made therefrom, with any of a variety of vehicles. These novel coating compositions fill a long felt need, offer possibilities for wider uses, and possess improved properties for currently acceptable applications.

The present invention is specific to a more generic invention in this field, set forth and claimed in my cofiled application, Serial No. 479,493, and is a continuation in part of my previously filed copending applications, Serial Nos. 348,687 and 348,690, both filed July 31, 1940, and Serial No. 427,920, filed January 23, 1942.

What I claim as my invention and desire to secure by Letters Patent is:

1. The method of forming an azo pigment dyestuff composition which comprises suspending particles of azo pigment dyestuff in an aqueous medium and in their water-wet condition retained from formation, intimately associating with said particles water-insoluble metallic soap derived in part from "rosinic acid" and in part from "fatty type acid" by converting water-soluble soap of said acids to the said water-insoluble form in the presence of said suspended particles, and recovering the pigment with the insoluble soap associated therewith.

2. The method of forming an azo pigment dyestuff composition which comprises suspending particles of azo pigment dyestuff in an aqueous medium and in their water-wet condition retained from formation, intimately associating with said particles water-insoluble metallic soap derived in part from "rosinic acid" and in part from "fatty type acid" by converting water-soluble soap of said acids to the said water-insoluble form in the presence of said suspended particles, and recovering the pigment with the insoluble soap associated therewith, there being up to 10 parts by weight of said soap-forming acids in said insoluble soap to 100 parts by weight of pigment.

3. The method of forming an azo pigment dyestuff composition which comprises suspending particles of azo pigment dyestuff in an aqueous medium and in their water-wet condition retained from formation, intimately associating with said particles water-insoluble metallic soap derived in part from "rosinic acid" and in part from "fatty type acid" by converting water-soluble soap of said acids to the said water-insoluble form in the presence of said suspended particles, while simultaneously forming salt electrolyte in said aqueous medium as a result of the soap-conversion reaction, and recovering the pigment and insoluble soap from the aqueous medium with a small amount of said salt electrolyte associated therewith.

4. The method of forming an azo pigment dyestuff composition which comprises suspending particles of azo pigment dyestuff in an aqueous medium and in their water-wet condition retained from formation, intimately associating with said particles water-insoluble metallic soap derived in part from "rosinic acid" and in part from "fatty type acid" by converting water-soluble soap of said acids to the said water-insoluble form in the presence of said suspended particles, recovering the pigment with the insoluble soap associated therewith, and providing a small amount of salt electrolyte associated with the recovered pigment and soap by adding salt electrolyte at any stage in the process including the said recovery and retaining at least a portion thereof associated with the pigment and soap.

5. The method of forming an azo pigment dyestuff composition which comprises suspending particles of azo pigment dyestuff in an aqueous medium and in their water-wet condition retained from formation, said suspension being in the presence of water-soluble soap of "rosinic acid" and water-soluble soap of "fatty type acid," said acids being present in total amount up to 10 parts by weight to 100 parts by weight of pigment, adding an agent providing a metal cation capable of converting said soluble soaps to water-insoluble metallic soaps, and recovering the pigment particles with the insoluble soaps intimately associated therewith.

6. The method of forming an azo pigment dyestuff composition which comprises suspending particles of azo pigment dyestuff in an aqueous medium and in their water-wet condition retained from formation, said suspension being in the presence of water-soluble metallic soap of "rosinic acid" and water-soluble metallic soap of "fatty type acid," said acids being present in total amount up to 10 parts by weight to 100 parts by weight of pigment, adding a metallic salt capable of converting said soluble soaps to water-insoluble metallic soaps and of simultaneously forming salt electrolyte by said conversion, whereby the said insoluble soaps are precipitated in intimate association with the pigment particles while leaving salt electrolyte in solution, and separating the pigment particles and the soap from the major part of the suspending liquid while retaining a quantity of said liquid with said pigment particles, whereby the resulting soap-modified pigment is recovered with a small amount of salt electrolyte associated therewith.

7. An azo pigment dyestuff composition comprising azo pigment dyestuff and water-insoluble metallic soap derived in part from "rosinic acid" and in part from "fatty type acid," there being up to 10 parts by weight of said soap-forming acids to 100 parts by weight of pigment, said water-insoluble metallic soap being in intimate physical association with the pigment as a result of having been precipitated in the presence of said pigment suspended in an aqueous liquid in its water-wet condition retained from formation.

8. A composition according to claim 7 wherein the amount of "rosinic acid" is about twice the amount of "fatty type acid."

9. An azo pigment dyestuff composition in dry powdered form comprising particles containing azo pigment dyestuff, water-insoluble metallic soap of "rosinic acid," and water-insoluble metallic soap of "fatty type acid," there being up to 10 parts by weight of said soap-forming acids to 100 parts by weight of pigment, said water-insoluble metallic soaps being in intimate physical association with the pigment particles as a result of having been precipitated in the presence of said particles suspended in an aqueous liquid in their water-wet condition retained from formation.

10. A composition according to claim 9 in which the amount of "rosinic acid" is about twice the amount of "fatty type acid."

11. An azo pigment dyestuff composition comprising azo pigment dyestuff, water-insoluble metallic soap of "rosinic acid," water-insoluble metallic soap of "fatty type acid," and a small amount of salt electrolyte, there being up to 10 parts by weight of said soap-forming acids to 100 parts by weight of pigment, said water-insoluble metallic soaps being in intimate physical association with the pigment as a result of having been precipitated in the presence of the pigment suspended in its water-wet condition retained from formation.

12. An azo pigment dyestuff composition in dry powdered form comprising azo pigment dyestuff particles, water-insoluble metallic soap of "rosinic acid," water-insoluble metallic soap of "fatty type acid," and a small amount of salt electrolyte, there being up to 10 parts by weight of said soap-forming acids to 100 parts by weight of pigment, said water-insoluble metallic soaps being in intimate physical association with the pigment particles as a result of having been precipitated in the presence of said particles suspended in their water-wet condition retained from formation, and said salt electrolyte being physically associated with the resulting soap-modified pigment.

13. The method of making an azo pigment dyestuff coating composition which comprises incorporating into a non-aqueous liquid vehicle a soap-pigment mass comprising azo pigment dyestuff and water-insoluble metallic soap derived in part from "rosinic acid" and in part from "fatty type acid," said water-insoluble metallic soap being in intimate physical association with the pigment as a result of having been precipitated in the presence of said pigment suspended in an aqueous liquid in its water-wet condition retained from formation.

14. The method of making an azo pigment dyestuff coating composition which comprises incorporating into a non-aqueous liquid vehicle a soap-pigment mass comprising azo pigment dyestuff and water-insoluble metallic soap derived in part from "rosinic acid" and in part from "fatty type acid," the amount of rosinic acid being about twice the amount of fatty type acid and said acids being present in total amount up to 10 parts by weight to 100 parts by weight of pigment, said water-insoluble metallic soap being in intimate physical association with the pigment as a result of having been precipitated in the presence of said pigment suspended in an aqueous liquid in its water-wet condition retained from formation.

15. The method of making an azo pigment dyestuff coating composition which comprises simultaneously incorporating together into a non-aqueous liquid vehicle a soap-pigment mass and a small amount of salt electrolyte, said soap-pigment mass comprising azo pigment dyestuff and water-insoluble metallic soap derived in part from "rosinic acid" and in part from "fatty type acid," said water-insoluble metallic soap being in intimate physical association with the pigment as a result of having been precipitated in the presence of said pigment suspended in an aqueous liquid in its water-wet condition retained from formation.

16. The method of making an azo pigment dyestuff coating composition which comprises incorporating into a non-aqueous liquid vehicle a soap-pigment mass comprising azo pigment dyestuff, water-insoluble metallic soap of "rosinic acid," and water-insoluble metallic soap of "fatty type acid," said water-insoluble metallic soaps being in intimate physical association with the pigment as a result of having been precipitated in the presence of said pigment suspended in an aqueous liquid in its water-wet condition retained from formation.

17. The method of making an azo pigment dyestuff coating composition which comprises simultaneously incorporating together into a non-aqueous liquid vehicle a soap-pigment mass and a small amount of salt electrolyte, said soap-pigment mass comprising azo pigment dyestuff, water-insoluble metallic soap of "rosinic acid," and water-insoluble metallic soap of "fatty type acid," said water-insoluble metallic soaps being in intimate physical association with the pigment as a result of having been precipitated in the presence of said pigment suspended in an aqueous liquid in its water-wet condition retained from formation.

18. An azo pigment dyestuff coating composition comprising a non-aqueous liquid vehicle incorporating an azo pigment dyestuff with associated water-insoluble metallic soap derived in part from "rosinic acid" and in part from "fatty type acid," said pigment and said insoluble soap having been intimately associated together prior to their incorporation into said vehicle by precipitating said water-insoluble soap in the presence of particles of the pigment suspended in an aqueous liquid in their water-wet condition retained from formation.

19. An azo pigment dyestuff coating composition comprising a non-aqueous liquid vehicle incorporating an azo pigment dyestuff with associated water-insoluble metallic soap derived in part from "rosinic acid" and in part from "fatty type acid," there being up to 10 parts by weight of said soap-forming acids to 100 parts by weight of pigment and about twice the amount of "rosinic acid" as of "fatty type acid," said pigment and said insoluble soap having been intimately associated together prior to their incorporation into said vehicle by precipitating said water-insoluble soap in the presence of particles of the pigment suspended in an aqueous liquid in their water-wet condition retained from formation.

20. An azo pigment dyestuff coating composition comprising a non-aqueous liquid vehicle incorporating an azo pigment dyestuff, water-insoluble metallic soap derived in part from "rosinic acid" and in part from "fatty type acid,"

and a small amount of salt electrolyte, said pigment and said insoluble soap having been intimately associated together prior to their incorporation into said vehicle by precipitating said water-insoluble soap in the presence of particles of the pigment suspended in an aqueous liquid in their water-wet condition retained from formation.

21. An azo pigment dyestuff coating composition comprising a non-aqueous liquid vehicle incorporating an azo pigment dyestuff, water-insoluble metallic soap derived in part from "rosinic acid" and in part from "fatty type acid," and a small amount of salt electrolyte, there being up to 10 parts by weight of said soap-forming acids to 100 parts by weight of pigment and about twice the amount of "rosinic acid" as of "fatty type acid," said pigment and said insoluble soap having been intimately associated together prior to their incorporation into said vehicle by precipitating said water-insoluble soap in the presence of particles of the pigment suspended in an aqueous liquid in their water-wet condition retained from formation.

22. An azo pigment dyestuff coating composition comprising a non-aqueous liquid vehicle incorporating an azo pigment dyestuff with associated water-insoluble metallic soap of "rosinic acid" and water-insoluble metallic soap of "fatty type acid," said pigment and said insoluble soap having been intimately associated together prior to their incorporation into said vehicle by precipitating said water-insoluble soaps in the presence of particles of the pigment suspended in an aqueous liquid in their water-wet condition retained from formation.

23. An azo pigment dyestuff coating composition comprising a non-aqueous liquid vehicle incorporating an azo pigment dyestuff with associated water-insoluble metallic soap of "rosinic acid" and water-insoluble metallic soap of "fatty type acid," there being up to 10 parts by weight of said soap-forming acids to 100 parts by weight of pigment and about twice the amount of "rosinic acid" as of "fatty type acid," said pigment and said insoluble soap having been intimately associated together prior to their incorporation into said vehicle by precipitating said water-insoluble soaps in the presence of particles of the pigment suspended in an aqueous liquid in their water-wet condition retained from formation.

24. An azo pigment dyestuff coating composition comprising a non-aqueous liquid vehicle incorporating an azo pigment dyestuff with associated water-insoluble metallic soap of "rosinic acid," water-insoluble metallic soap of "fatty type acid," and a small amount of salt electrolyte, said pigment and said insoluble soaps having been intimately associated together prior to their incorporation into said vehicle by precipitating said water-insoluble metallic soaps of the two said acids in the presence of the pigment suspended in an aqueous liquid in its water-wet condition retained from formation, said salt electrolyte having been associated with the resulting soap-pigment mass at any stage prior to completion of its incorporation into the said vehicle.

25. An azo pigment dyestuff coating composition comprising a non-aqueous liquid vehicle incorporating an azo pigment dyestuff with associated water-insoluble metallic soap of "rosinic acid," water-insoluble metallic soap of "fatty type acid," and a small amount of salt electrolyte, there being up to 10 parts by weight of said soap-forming acids to 100 parts by weight of pigment and about twice the amount of "rosinic acid" as of "fatty type acid," said pigment and said insoluble soaps having been intimately associated together prior to their incorporation into said vehicle by precipitating said water-insoluble metallic soaps of the two said acids in the presence of the pigment suspended in an aqueous liquid in its water-wet condition retained from formation, said salt electrolyte having been associated with the resulting soap-pigment mass at any stage prior to completion of its incorporation into the said vehicle.

26. An azo pigment dyestuff coating composition comprising a non-aqueous liquid vehicle incorporating an azo pigment dyestuff with associated water-insoluble metallic soap of "rosinic acid," water-insoluble metallic soap of "fatty type acid," and salt electrolyte, said pigment, said soaps, and a small amount of said salt electrolyte having been associated together prior to their incorporation into said vehicle by precipitating said water-insoluble metallic soaps of the two said acids in the presence of salt electrolyte and of particles of the pigment suspended in an aqueous liquid in their water-wet condition retained from formation, and by recovering the resulting soap-modified pigment from said liquid in such manner as to leave a small amount of salt electrolyte from the suspending liquid associated therewith.

27. An azo pigment dyestuff coating composition comprising a non-aqueous liquid vehicle incorporating an azo pigment dyestuff with associated water-insoluble metallic soap of "rosinic acid," water-insoluble metallic soap of "fatty type acid," and a small amount of salt electrolyte, there being up to 10 parts by weight of said soap-forming acids to 100 parts by weight of pigment, said pigment, said soaps, and said salt electrolyte having been associated together prior to their incorporation into said vehicle by precipitating said water-insoluble metallic soaps of the two said acids in the presence of salt electrolyte and of particles of the pigment suspended in an aqueous liquid in their water-wet condition retained from formation, and by recovering the resulting soap-modified pigment from said liquid in such manner as to leave a small amount of salt electrolyte from the suspending liquid associated therewith.

GRADY M. O'NEAL.

CERTIFICATE OF CORRECTION.

Patent No. 2,350,522.　　　　　　　　　　　　　　　　　June 6, 1944.

GRADY M. O'NEAL.

It is hereby certified that error appears in the printed specification of the above numbered patent requiring correction as follows: Page 4, first column, line 18, for "formed as" read --formed are--; page 5, first column, line 53, for "of" read --for--; page 6, first column, line 70, for "rosinic-fatty" read --rosinic and fatty--; and second column, line 44, for "octadecatrieonic" read --octadecatrienoic--; page 9, second column, line 31, strike out "a small amount of" and insert the same after the word "and" in line 30; and that the said Letters Patent should be read with this correction therein that the same may conform to the record of the case in the Patent Office.

Signed and sealed this 12th day of September, A. D. 1944.

Leslie Frazer (Seal)　　　　　　　　　　　　　　　　　Acting Commissioner of Patents.